United States Patent
Marchione (10) Patent No.: US 9,987,683 B2
(45) Date of Patent: Jun. 5, 2018

(54) METALLIC 3D PRINTING DETACHMENT TECHNIQUE

(71) Applicant: Caterpillar Inc., Peoria, IL (US)

(72) Inventor: Thierry Marchione, Heber City, UT (US)

(73) Assignee: Caterpillar Inc., Deerfield, IL (US)

( * ) Notice: Subject to any disclaimer, the term of this patent is extended or adjusted under 35 U.S.C. 154(b) by 287 days.

(21) Appl. No.: 14/751,758

(22) Filed: Jun. 26, 2015

(65) Prior Publication Data

US 2016/0375490 A1    Dec. 29, 2016

(51) Int. Cl.
| | |
|---|---|
| *B22F 3/105* | (2006.01) |
| *B29C 67/00* | (2017.01) |
| *B33Y 10/00* | (2015.01) |
| *B33Y 80/00* | (2015.01) |
| *B22F 5/00* | (2006.01) |

(52) U.S. Cl.
CPC ........ *B22F 3/1055* (2013.01); *B29C 67/0077* (2013.01); *B22F 5/003* (2013.01); *B22F 2003/1058* (2013.01); *B22F 2999/00* (2013.01); *B33Y 10/00* (2014.12); *B33Y 80/00* (2014.12); *Y02P 10/295* (2015.11)

(58) Field of Classification Search
CPC . B22F 3/1055; B22F 2003/1058; B33Y 10/00
See application file for complete search history.

(56) References Cited

U.S. PATENT DOCUMENTS

| | | |
|---|---|---|
| 7,281,901 B2 | 10/2007 | Garman et al. |
| 7,381,921 B2 | 6/2008 | Hagemeister et al. |
| 8,610,027 B2 | 12/2013 | Hovel et al. |
| 8,979,971 B2 | 3/2015 | Schuster |
| 2011/0241947 A1 | 10/2011 | Scott et al. |
| 2012/0090770 A1* | 4/2012 | Cavaliere ............... B29C 70/30 156/172 |

* cited by examiner

*Primary Examiner* — Robert Harlan
(74) *Attorney, Agent, or Firm* — Miller, Matthias & Hull; William R. Tinker (57) ABSTRACT

A method for metallic three-dimensional (3D) printing of a part is disclosed. The method may include selecting a material for a build plate adapted to form an intermetallic phase with the part at an interface between the build plate and the part, and forming the intermetallic phase with the part at the interface.

14 Claims, 6 Drawing Sheets

METALLIC 3D PRINTING DETACHMENT TECHNIQUE

FIELD OF THE DISCLOSURE

The present disclosure relates generally to metallic three-dimensional (3D) printing and, more particularly, to metallic 3D printing detachment techniques.

BACKGROUND OF THE DISCLOSURE

Three-dimensional (3D) printing, or additive manufacturing, may be used to make 3D objects. In particular, metallic 3D printing can be used to make 3D metal objects. The objects can be of any shape or geometry, and may be based off of a 3D model or other electronic data source. In so doing, metallic 3D printing may eliminate shape restrictions, time and cost expenses of typical casting techniques used to produce the same objects.

To produce an object, a 3D printer deposits successive layers of a metallic material in powder form on top of a metal build plate, or substrate, under computer control. The 3D printer may employ techniques, such as, selective laser sintering, in order to bind the metallic material together to create a solid structure on the build plate. More specifically, a computer-controlled laser beam may sinter the metallic material on the build plate in a vertically additive, layer-by-layer fashion.

For the metallic material to weld or bond to the build plate during processing, typically a build plate material is of a similar or same material as the metallic material of the object to be produced. After the object is completely formed on the build plate, the object is removed from the build plate via a cutting operation, such as, saw cutting, electric discharge machining, milling, and the like. However, such removal processes may be time-consuming, expensive, and may damage the object. In addition, if the build plate is to be used again for another build, it must be refurbished. Furthermore, when the build plate is made of the same material as the object, such as titanium, the cost of the build plate can be particularly expensive for a piece that will eventually be discarded.

A selective laser melting process is disclosed in U.S. Pat. No. 8,610,027, entitled, "Process for Producing a 3-Dimensional Component by Selective Laser Melting (SLM)." The '027 patent describes initially applying a separating layer to the surface of the platform before applying powdered layers of material for the component. The separating layer is produced from a different material as a material of the component. In the '027 patent, the separating layer can be produced by applying one or more layers of a metal foil or metal powder, the melting point of which is lower than the melting point of the component to be produced. While effective, improvements are still desired to provide a more efficient and cost-effective detachment technique for objects made from metallic 3D printing.

SUMMARY OF THE DISCLOSURE

In accordance with one embodiment, a method for metallic three-dimensional (3D) printing of a part is disclosed. The method may include selecting a material for a build plate adapted to form an intermetallic phase with the part at an interface between the build plate and the part, and forming the intermetallic phase with the part at the interface.

In accordance with another embodiment, a method for detaching a part from a build plate is disclosed. The method may include using a build plate composed of a material that creates an intermetallic phase at an interface between the build plate and the part when the part is formed on the build plate via metallic three-dimensional (3D) printing, and removing the part from the build plate at the interface.

In accordance with another embodiment, a structure is disclosed. The structure may include a build plate, a part formed on the build plate via metallic three-dimensional (3D) printing, and an intermetallic phase between the build plate and the part.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
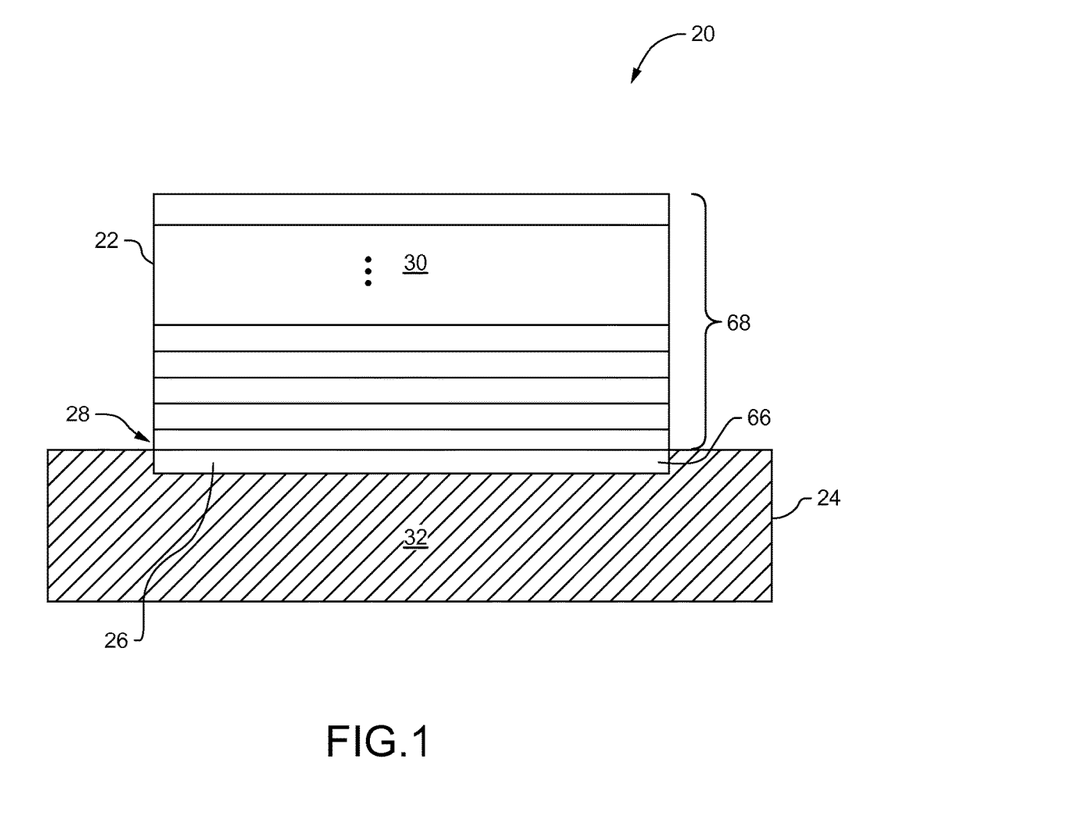
FIG. 1 is a schematic representation of a structure formed via metallic three-dimensional (3D) printing, in accordance with one embodiment of the present disclosure.

Referring now to the drawings, and with specific reference to FIG. 1, a structure consistent with certain embodiments of the present disclosure is generally referred to by reference numeral 20. The structure 20 may comprise a part 22 formed on a build plate 24 via metallic three-dimensional (3D) printing. For example, selective laser sintering or other metallic 3D printing techniques may be used to build the part 22 in a series of layers 66, 68 on top of the build plate 24. The part 22 may comprise any object or component for use in a variety of applications, such as, but not limited to, engine components. The build plate 24 may comprise a solid piece of material that serves as a support and a surface to which the part 22 is built upon. Each of the part 22 and the build plate 24 may be composed of a metal or a metal-based alloy.

In accordance with an embodiment of the present disclosure, a material of the build plate 24 may be selected such that an intermetallic phase 26 is created at an interface 28 between the part 22 and the build plate 24. The material of the build plate 24 may be different and dissimilar from a material of the part 22. More specifically, the material of the part 22 may be composed of a first metallic element 30, while the material of the build plate 24 may be composed of a second metallic element 32 that forms the intermetallic phase 26 with the first metallic element 30.

Figure 2:
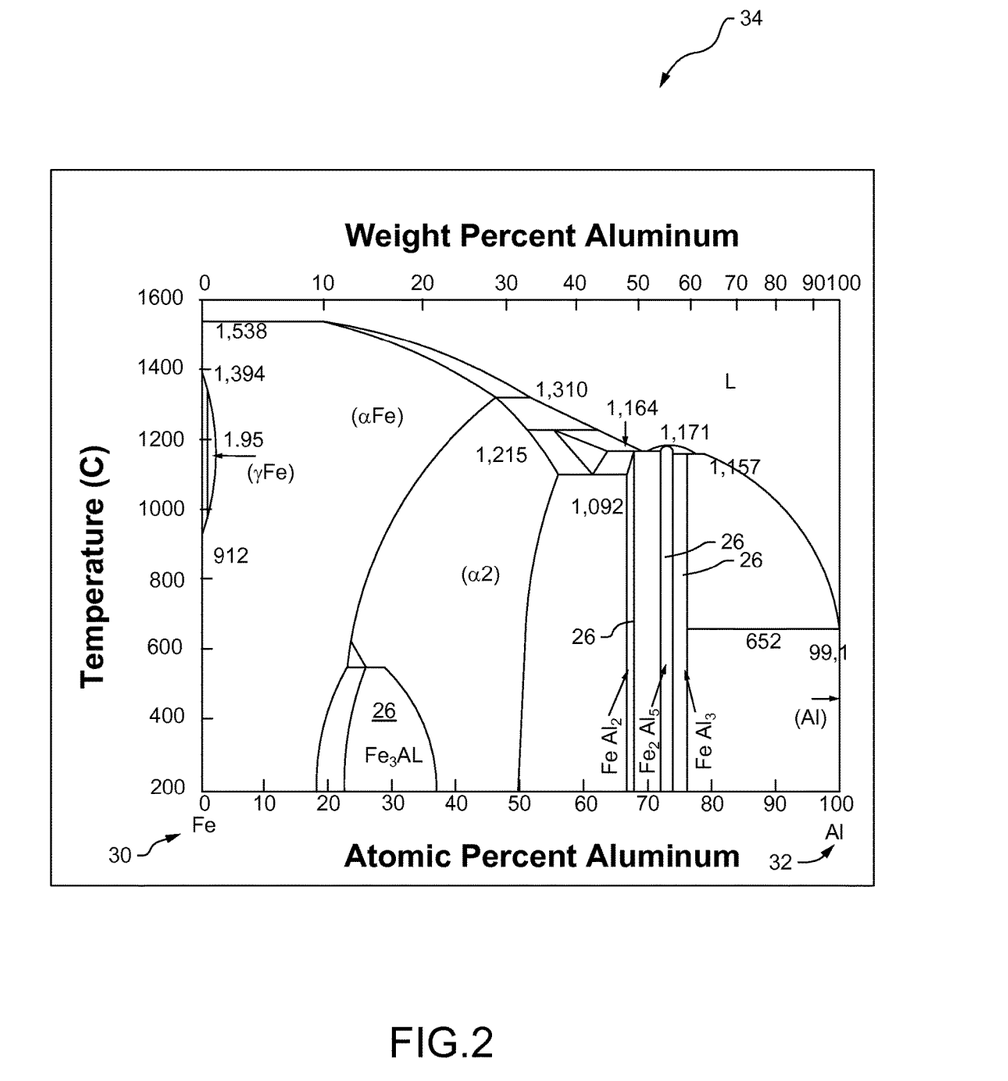
FIG. 2 is an example equilibrium phase diagram used to determine whether an intermetallic phase can be created between two materials, in accordance with another embodiment.

During metallic 3D printing, the intermetallic phase 26 may form depending on a chemical composition of the first metallic element 30 and the second metallic element 32 when sintered together. More specifically, a determination on whether the first metallic element 30 and the second metallic element 32 creates one or more intermetallic phases 26 is based on their equilibrium phase diagram 34, an example of which is shown in FIG. 2. In the example equilibrium phase diagram 34 of FIG. 2, the first metallic element 30 is iron (Fe), and the second metallic element 32 is aluminum (Al). However, other metallic elements and/or alloys may be used. Analysis of equilibrium phase diagrams between two or more materials may determine compatible material couples for the part 22 and the build plate 24 in order to generate the intermetallic phase 26 at the interface 28.

Various intermetallic phases 26 may form between the first metallic element 30 and the second metallic element 32 depending on a ratio of the chemical compositions, such as an atomic ratio and a weight ratio of the second metallic element 32 to the first metallic element 30. The formation of intermetallic phases 26 may also depend on a temperature at which the first metallic element 30 and the second metallic element 32 are heated together. The intermetallic phases 26 may comprise compound mixtures of the first metallic element 30 and the second metallic element 32. In the example of FIG. 2, the intermetallic phases 26 may be compounds of iron (Fe) and aluminum (Al), such as, $Fe_3Al$, $FeAl_2$, $Fe_2Al_5$, and $FeAl_3$. Thus, materials for the part 22 and the build plate 24 may be chosen to deliberately create the intermetallic phase 26 at the interface 28.

For example, the first metallic element 30 for the material of the part 22 may be either nickel (Ni), iron (Fe), titanium (Ti), or alloys based thereof. Based on those examples for the first metallic element 30, aluminum (Al) or an aluminum-based alloy may be selected as the second metallic element 32 for material of the build plate 24 in order to create the intermetallic phase 26 at the interface 28. However, other metallic elements and/or alloys may be used for the materials of the part 22 and/or the build plate 24 depending on different equilibrium phase diagrams for various materials.

Figure 3:
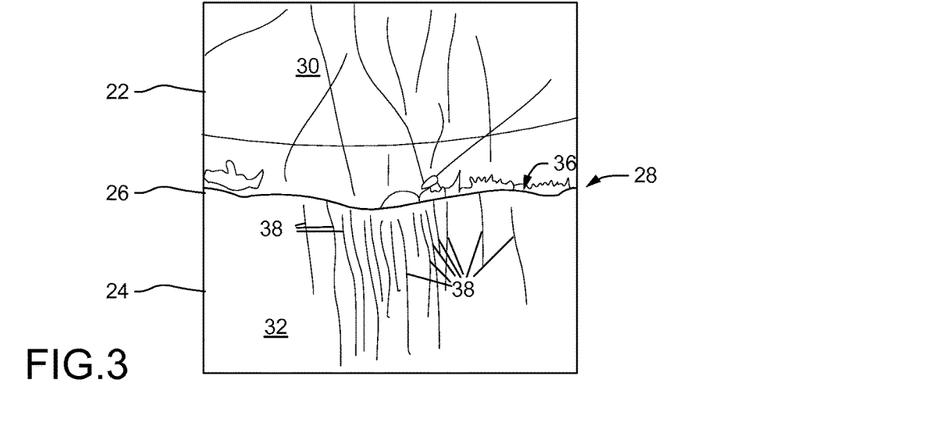
FIG. 3 is a microscopic view of an intermetallic phase at an interface between a part and a build plate of the structure of FIG. 1.
Figure 4:
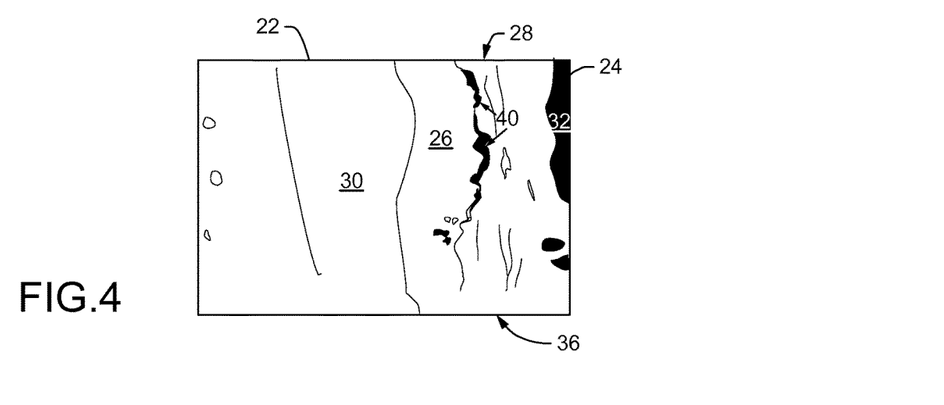
FIG. 4 is another microscopic view of the intermetallic phase of FIG. 3, showing cracks within the intermetallic phase.
Figure 5:
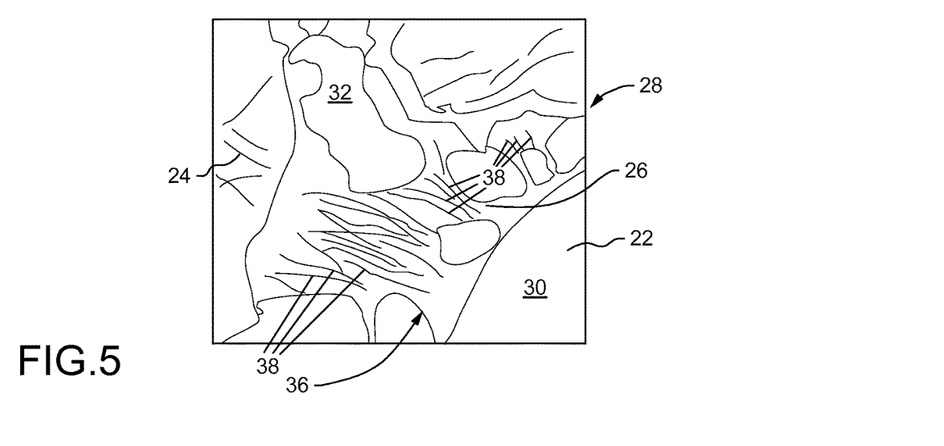
FIG. 5 is a microscopic view of an intermetallic phase in another structure showing needle-like formations within the intermetallic phase, in accordance with another embodiment.

Referring now to FIGS. 3-5, with continued reference to FIGS. 1 and 2, the intermetallic phase 26 is a solid-state phase containing two (or more) metallic elements with a fixed stoichiometry and an ordered crystal structure 36. The ordered crystal structure 36 of the intermetallic phase 26 at the interface 28 between the part 22 and the build plate 24 may include microscopic needle-shaped formations 38 and cracks 40. The needle-shaped formations 38 and cracks 40 provide a brittle quality in the intermetallic phase 26, thereby allowing for easy detachment of the part 22 from the build plate 24.

Figure 6:
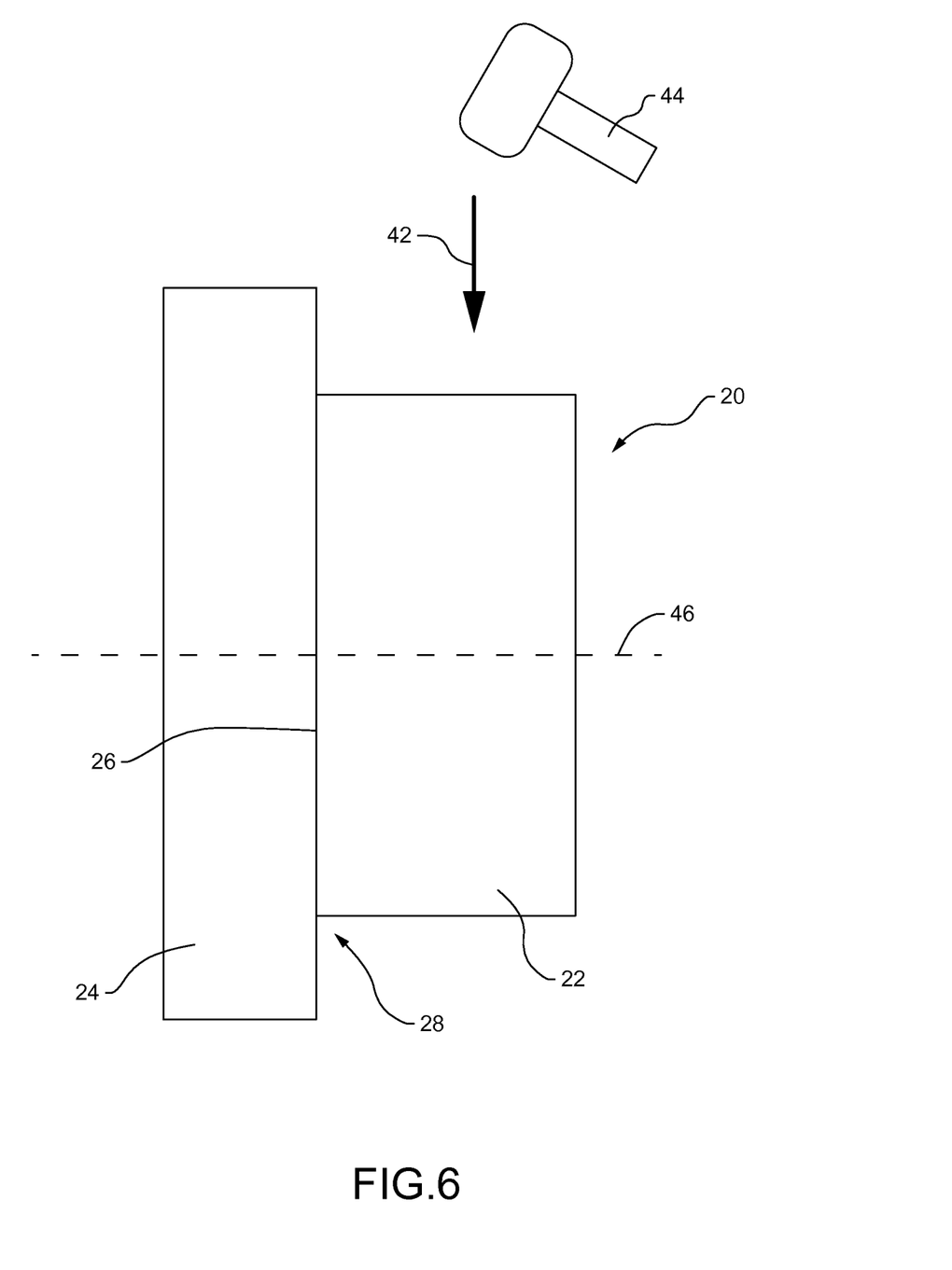
FIG. 6 is a diagram illustrating how to apply a manual force to the structure of FIG. 1 to remove the part from the build plate.

By selecting the build plate material such that the intermetallic phase 26 is created at the interface 28 with the part 22, removal of the part 22 from the build plate 24 may be facilitated without a need for a cutting operation. For example, as shown in FIG. 6, a manual force 42 may be applied through a simple hand tool 44, such as, a mallet or a hammer, onto the part 22 in order to remove the part 22 from the build plate 24. The force 42 may be directed perpendicular to a central axis 46 of the structure 20. However, other configurations and techniques for removing the part 22 from the build plate 24 may be used.

In an example, a pressure of approximately ten newtons per square millimeter (10 $N/mm^2$) may be applied on the part 22 to remove the part 22 from the build plate 24, although other amounts of pressure may be used. Due to the brittle quality of the intermetallic phase 26 at the interface 28, the part 22 may break apart from the build plate 24 with only the application of manual force 42. In so doing, the need for time-consuming and expensive finishing processes, such as, saw cutting, electric discharge machining, milling, etc., in order to remove the part 22 from the build plate 24 is eliminated.

Figure 7:
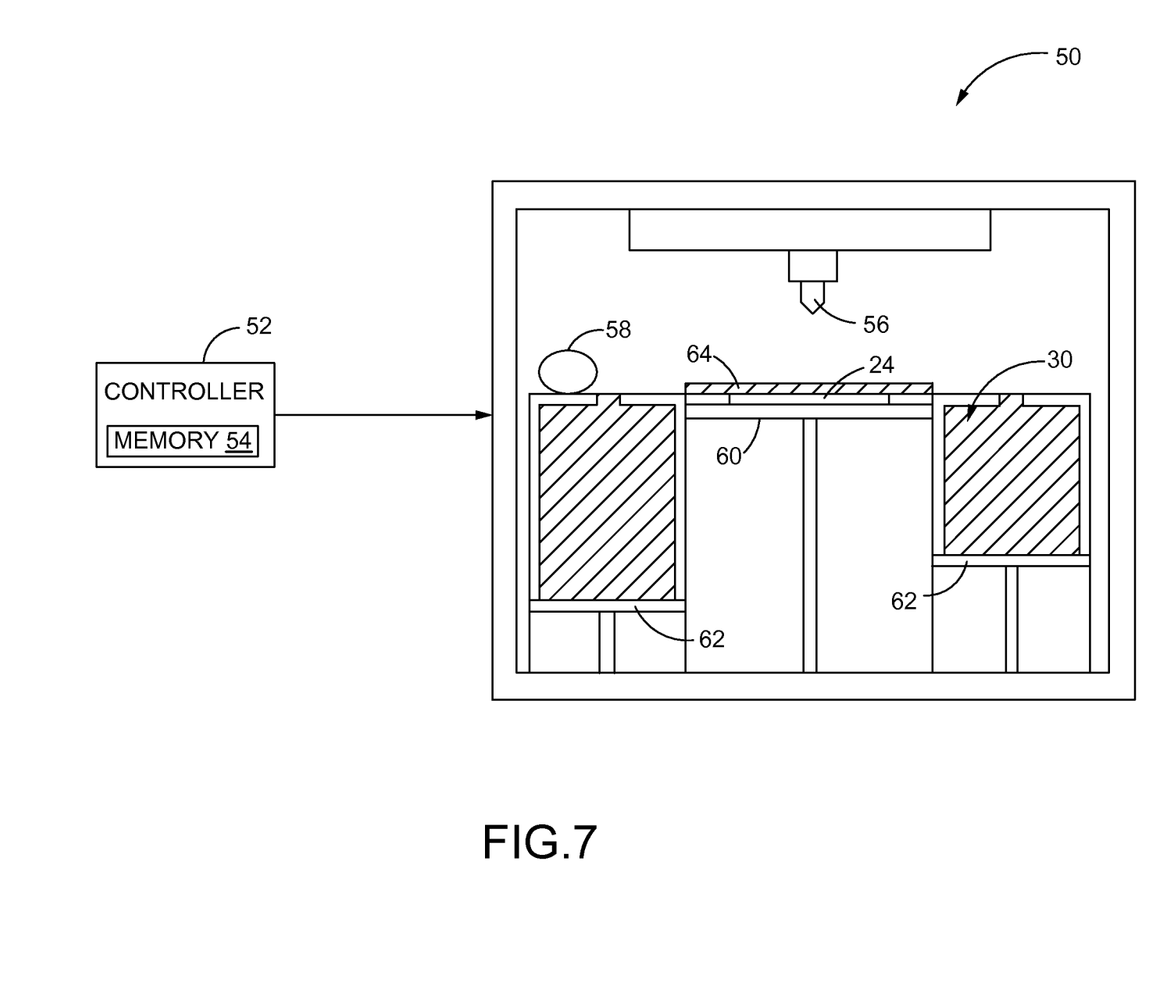
FIG. 7 is a schematic representation of a 3D printer used to create the structure of FIG. 1, in accordance with another embodiment.

Referring now to FIG. 7, with continued reference to FIGS. 1-6, a 3D printer 50 is shown, in accordance with another embodiment. The 3D printer 50 may include a controller 52, a laser 56, a roller 58, an object bed 60, and one or more powder beds 62. The controller 52 of the 3D printer 50 may be configured to print the part 22 on the build plate 24. In operative communication with the controller 52, the laser 56 may heat selective portions of a powdered material to form the part 22 layer-by-layer. A series of layer-wise iterations of the laser 56 may be controlled in accordance with instructions stored on a memory 54 associated with the controller 52.

For example, the build plate 24 may be disposed within the object bed 60 of the 3D printer 50. The first metallic element 30, or material for the part 22, in powdered form may be provided to the roller 58 in powder beds 62. The roller 58 may be configured to spread the first metallic element 30 in powdered form over the object bed 60. More specifically, the roller 58 may spread a first powder layer 64 of the first metallic element 30 over the build plate 24.

A power of the laser 56 may be calibrated according to predetermined conditions for forming the intermetallic phase 26 between the first powder layer 64 and the build plate 24. For instance, the laser power of the 3D printer 50 may be calibrated such that the laser 56 emits sufficient temperature to the first powder layer 64 and the build plate 24 to form one of the intermetallic phases 26 identified from the equilibrium phase diagram 34. The laser 56 may then heat selective portions of the first powder layer 64 on the build plate 24 such that the first powder layer 64 penetrates into the build plate 24, thereby forming a first layer 66 (FIG. 1) of the part 22 and the intermetallic phase 26 between the part 22 and the build plate 24.

The object bed 60 may be lowered and a second powder layer spread over the object bed 60 in order for the laser 56 to perform a next iteration. During the next iteration, selective portions of the second powder layer are selectively heated such that the second powder layer fuses with the first layer 66 of the part 22 in order to form the second layer 68 (FIG. 1) of the part 22. Subsequent powder layers are spread over the object bed 60 and selectively heated such that each powder layer fuses with the previously heated layer of the part 22. The 3D printer 50 may continue this process for as many layers as is required to manufacture the part 22. The entire structure 20 may be removed from the 3D printer 50 once manufacturing is completed.

After the first layer 66 of the part 22 and the intermetallic phase 26 is created, subsequent layers 68 of the part 22 are composed purely of the first metallic element 30. Thus, the intermetallic phase 26 is created solely at the interface 28 between the part 22 and the build plate 24. As such, when manual force 42 is used to detach the part 22, the brittle quality of the intermetallic phase 26 allows the part 22 to easily break apart from the build plate 24 at the interface 28 without damaging the part 22.

INDUSTRIAL APPLICABILITY

In general, the foregoing disclosure finds utility in various industrial applications, such as, in metallic 3D printing. The systems and methods disclosed herein may be used to create a metal object or component for use in a variety of applications, such as, but not limited to, engine components. In addition, the disclosed systems and methods can be employed in fabricating and removing part supports. Particularly, the disclosed systems and methods use a build plate made of a material that is chosen such that an intermetallic phase is created at the interface between the build plate and the part.

In so doing, the part may be easily removed from the build plate without damage to the part using only a slight pressure via a hand tool, thereby eliminating the need for time-consuming and expensive cutting operations and other finishing processes. Furthermore, the disclosed systems and methods provide for the build plate material to be different from and dissimilar to the part material. As such, significant cost savings may be realized since the build plate material can be made of cheaper metals, which may be later discarded at minimal cost.

Figure 8:
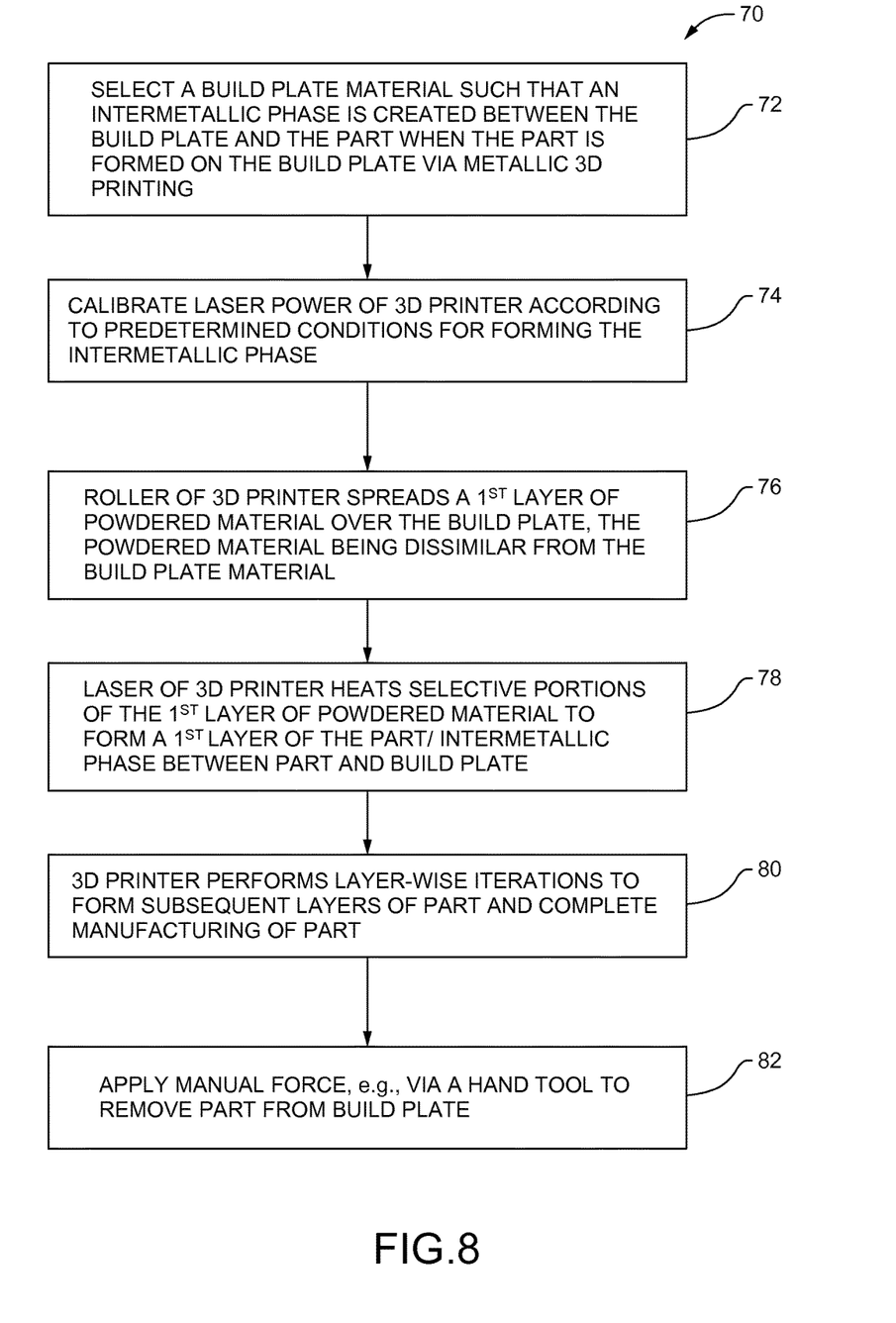
FIG. 8 is a flowchart illustrating a process for metallic 3D printing of a part and for detaching the part from a build plate, in accordance with another embodiment.

Turning now to FIG. 8, with continued reference to FIGS. 1-7, a flowchart illustrating a process 70 for metallic 3D printing of a part and for detaching the part from a build plate is shown, in accordance with another embodiment of the present disclosure. At block 72, the material of the build plate may be selected such that an intermetallic phase is created with the part at the interface between the build plate and the part when the part is formed on the build plate via metallic 3D printing. At block 74, the laser power of the 3D printer may be calibrated according to predetermined conditions for forming the intermetallic phase.

A roller of the 3D printer may spread a first layer of a powdered material over the build plate, at block 76. The powdered material may be dissimilar from the material of the build plate. At block 78, a laser of the 3D printer may heat selective portions of the first layer of the powdered material to form a first layer of the part and the intermetallic phase between the part and the build plate. The 3D printer may perform a series of layer-wise iterations to form subsequent layers of the part and complete manufacturing of the part, at block 80. A force may be applied manually, such as, via a hand tool, in order to remove the part from the build plate, at block 82. Due to the brittle intermetallic interface between the part and the build plate, the part may be easily detached from the build plate without damaging the part.

It is to be understood that the flowchart in FIG. 8 is shown and described as an example only to assist in disclosing the features described above, and that more or less steps than that shown in a same or different order than that shown may be included in the process without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A method for metallic three-dimensional (3D) printing of a part, comprising:
    selecting a material for a build plate adapted to form an intermetallic phase with the part at an interface between the build plate and the part;
    forming the intermetallic phase with the part at the interface; and
    calibrating a laser power of a 3D printer according to predetermined conditions for forming the intermetallic phase.

2. The method of claim 1, further comprising spreading a first layer of a powdered material over the build plate, the powdered material being dissimilar from the material of the build plate.

3. The method of claim 2, further comprising heating selective portions of the first layer of the powdered material to form a first layer of the part and the intermetallic phase between the part and the build plate.

4. The method of claim 3, further comprising spreading a plurality of layers of the powdered material on the first layer of the part, and selectively heating selective portions of each of the plurality layers to form subsequent layers of the part.

5. The method of claim 4, further comprising manually applying a force on the part to remove the part from the build plate.

6. The method of claim 4, further comprising using aluminum (Al) as the material of the build plate.

7. The method of claim 6, further comprising using one of nickel (Ni), iron (Fe), or titanium (Ti) as the powdered material to form the part.

8. A method for detaching a part from a build plate, comprising:
    using a build plate composed of a material that creates an intermetallic phase at an interface between the build plate and the part when the part is formed on the build plate via metallic three-dimensional (3D) printing; and
    removing the part from the build plate at the interface.

9. The method of claim 8, further comprising calibrating a laser power of a 3D printer according to predetermined conditions for forming the intermetallic phase.

10. The method of claim 8, further comprising selecting aluminum (Al) as the material of the build plate.

11. The method of claim 10, further comprising selecting one of nickel (Ni), iron (Fe), or titanium (Ti) as a material of the part.

12. The method of claim 8, wherein the part is removed from the build plate by manually applying a force on the part after the part is formed on the build plate via metallic 3D printing.

13. The method of claim 12, further comprising using a hand tool to apply the force on the part to remove the part from the build plate.

14. The method of claim 12, further comprising applying approximately ten newtons per square millimeter (10 N/mm2) on the part to remove the part from the build plate.

\* \* \* \* \*